United States Patent

[11] 3,578,846

[72] Inventor Wu Chen
Royersford, Pa.
[21] Appl. No. 795,617
[22] Filed Jan. 31, 1969
[45] Patented May 18, 1971
[73] Assignee Sperry Rand Corporation
New York, N.Y.

[54] MULTIPLE-STAGE OPTICAL INFORMATION PROCESSING SYSTEM
2 Claims, 7 Drawing Figs.

[52] U.S. Cl. .......... 350/162, 356/71
[51] Int. Cl. .......... G02b 27/38
[50] Field of Search .......... 350/3.5, 162 (SF); 356/71; 340/146.3

[56] References Cited
UNITED STATES PATENTS

| | | | |
|---|---|---|---|
| 3,292,148 | 12/1966 | Giuliano et al. | 340/146.3 |
| 3,438,693 | 4/1969 | Cook | 350/162 |
| 3,488,106 | 1/1970 | Lohmann | 350/162 |

OTHER REFERENCES

Cutrona et al., IRE TRANSACTIONS ON INFORMATION THEORY, Vol., June 1960, pp. 386— 398 (copy in 350/162)

Goodman, INTRODUCTION TO FOURIER OPTICS, Mc-Gran-Hill, New York, June, 1968, pp. 176— 182 relied on (Sci. Lib. Call No. QC355,G6)

*Primary Examiner*—David Schonberg
*Assistant Examiner*—Ronald J. Stern
*Attorneys*—Charles C. English, William E. Cleaver and Stanley B. Green

ABSTRACT: An optical pattern recognition system is disclosed which has multiple reference-pattern capability and materially decreases the space occupied as compared with the prior art. These advantages flow from the use of a zigzag optical path employing concave mirrors in the system and a novel observation plane which allows cascaded multistage operation. An additional advantage is that the mirrors used may be made of metal or other material and force cooled allowing the use of higher intensity sources.

INVENTOR
WU CHEN

BY Stanley B. Green
ATTORNEY

MULTIPLE-STAGE OPTICAL INFORMATION PROCESSING SYSTEM

This invention relates to optical information processing and particularly to pattern recognition by the use of an optical spatial filter and Fourier transformation device.

Prior art systems of this type had a variety of drawbacks which are overcome through the use of this invention. Due to the required resolving power of the recording material and the criticality of optical adjustments, practical systems of this type required optical paths of two meters or more. Further complicating the arrangement is the requirement for rigidity, as can be expected.

Another disadvantage is the need for mechanically moving parts if the system is to have multiple pattern recognition capability. This need is clearly in conflict with the need for rigidity and critical adjustment in the optical path. A further disadvantage is the low level of the output making detection difficult, since an increase in light intensity could damage the spatial filters and even the lenses due to heating.

The present invention overcomes these drawbacks and provides for a more compact optical system without shortening the optical path. Further the present invention has multiple pattern recognition capability while at the same time having no mechanically moving parts, thus satisfying the requirement for rigidity.

Further the present invention allows the use of more powerful sources thus increasing the output level and overcoming the problems in detection caused by low level outputs in the prior art.

It is therefore one object of the present invention to provide an optical pattern recognition system which is more compact than heretofore available while at the same time providing the long optical path necessary for practical systems.

A further object of the present invention is to provide an optical pattern recognition system with multiple pattern recognition capability without the use of mechanically moving parts. Another object of the present invention is to allow the use of more powerful sources significantly increasing the output level.

Other and further objects will be apparent from the specification and claims appended hereto.

Figure 4A:

FIG. 4*a* shows an example of an input with multiple patterns.

Figure 4B:
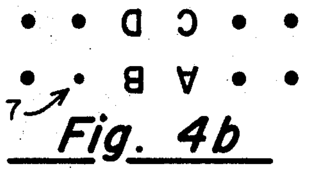

FIG. 4*b* shows the signal on the observation plane indicating a match.

Figure 5:
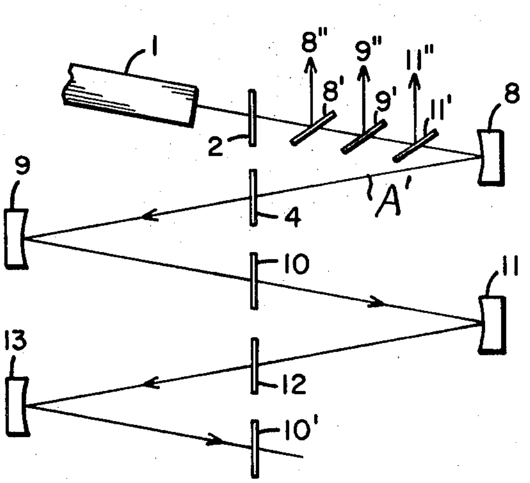

FIG. 5 shows another embodiment of the invention.

Figure 6:
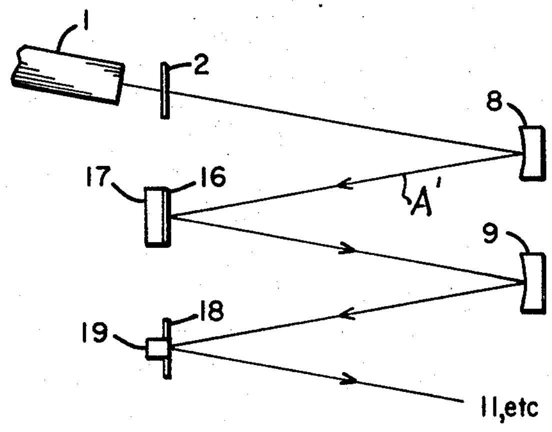

FIG. 6 shows a further embodiment of the invention.

Figure 1:
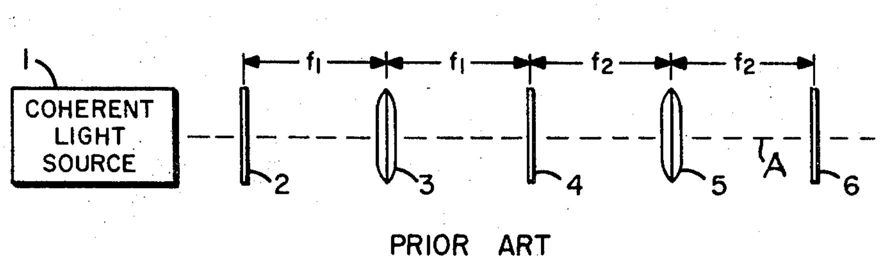
PRIOR ART Fig. 1
FIG. 1 shows a prior art optical information processing system.

FIG. 1 shows the optical system used in the prior art which is improved by the present invention. Indicated schematically at 1 is a source of collimated coherent light. On the projection axis A of source 1 and placed some distance to the right of source 1 is a photographic transparency 2 containing an input pattern or input patterns to be recognized or matched by the system. Although the use of a photographic transparency as a system input is disclosed, any other type of input media such as an acoustic tank could be used which simulates the effect of a slit. Convex lens 3 is placed to the right of transparency 2 by a distance equal to its focal length and along the axis A. Optical spatial filter 4 having properties discussed hereinafter is placed to the right of lens 3 along axis A a distance equal to the focal length of the lens 3. Convex lens 5 is placed to the right of filter 4 along axis A a distance equal to the focal length of this lens. Finally, recognition or detection is effected in plane 6 which is spaced from lens 5 a distance equal to the focal length of the lens 5. Plane 6 may be along axis A a ground glass focusing screen or the like, and the detection of the image on plane 6 can be made by human observation or by photo electric detection.

The collimated coherent light from source 1 passing through the transparency 2 produces, in the area between transparency 2 and lens 3 the diffraction pattern of the input pattern to be recognized. The diffraction pattern is not used directly since its position on an observation plane would be affected by the position of the input pattern. The lens 3 transforms the diffraction pattern into the spatial Fourier transform of the input pattern. The advantage of using the spatial Fourier transform lies in the fact that its position on an observation plane is not affected by the translational position of the input pattern. The spatial Fourier transform of the input pattern produced by lens 3 is then passed through spatial filter 4. Filter 4 is the spatial Fourier transform of the input pattern to be recognized. (One method of constructing spatial filters is disclosed by Vander Lugt in "Signal Detection by Complex Spatial Filtering" appearing in the Apr. 1964 issue of I EEE Transaction on Information Theory.)

The system in effect compares the spatial Fourier transform of the image pattern to be recognized with that of filter 4 and indicates by producing a plane wave signal whether or not a match exists between these transforms. This signal is then passed through lens 5 to effect a second Fourier transformation and a sharp focusing of the signal. The result on the observation plane 6 is shown in FIG. 4*b*.

FIG. 4*a* shows an example of a system input which corresponds to the transparency 2 in FIG. 1. FIG. 4*b* shows the result on the observation plane 6 of FIG. 1 if the filter 4 is the spatial Fourier transform of the letter A. The light point at 7 in FIG. 4*b* is the autoconvolution point indicating that the filter has matched with one of the input patterns. The other three light points on the same side are the cross-convolution points and the four points on the right-hand side of the center image are the correlation points. The autoconvolution point 7 is the best defined and the brightest among these points. The location of the high intensity spot 7 indicates the position of the pattern corresponding to the filter 4.

To construct a practical system of this type requires an optical path of two meters or more with rigid mechanical mountings. The intensity of the image of the convolution points and even the autoconvolution point is low compared with the center image of the system input. Both factors have limited the practicability of the method and make multiple stage processing very difficult. Another problem for multiple pattern recognition is the need for changing filter 4. If we replaced the original filter 4 with a second filter, to detect another pattern, the mechanical construction would be difficult due to the precise optical requirements.

Figure 2:
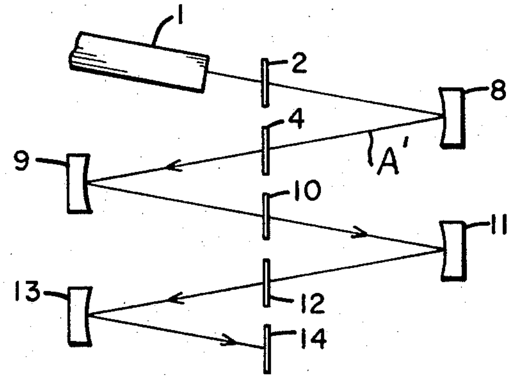
FIG. 2 shows one form of the system of the present invention.
Figure 3:
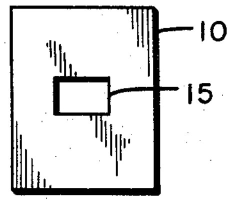
FIG. 3 shows an intermediate observation plane used in the system of the present invention.

FIGS. 2 and 3 show one embodiment of the present invention which solves these problems. In these two FIGS. similar reference characters represent similar elements as those in FIG. 1. The source of collimated coherent light is shown at 1. The system input is a transparency 2, disposed along the optical path A′ and to the right of source 1. A concave mirror 8 which replaces lens 3 is placed to the right of transparency 2 a distance equal to its focal length along the optical path A′. The mirror 8 is tilted with respect to the optical path as shown, so as to result in a zigzag optical path A′. Filter 4 is placed to the left of mirror 8 along the optical path A′ a distance equal to the focal length of mirror 8. Filter 4 is the spatial filter of the first stage of the apparatus. Concave mirror 9 replaces lens 5 and is placed to the left of filter 4, along the optical path A′, a distance equal to its focal length. Mirror 9 is also oriented so as to continue the zigzag optical path. Observation plane 10 which replaces plane 6 is placed to the right of mirror 9, along the optical path A′, a distance equal to the focal length of mirror 9. The structure just described with respect to FIG. 2 is the first stage of a multistage recognition system in which the spatial filter 4 represents the first pattern to be recognized. Continuing along the zigzag optical path A′ to the right of plane 10 is placed another concave mirror 11. The distance along the optical path A′ from plane 10 to mirror 11 is equal to the focal length of mirror 11 and it is oriented so as to continue the zigzag optical path. A second spatial filter 12 representing a second character to be recognized is placed to the left of mirror 11, a distance along the optical path equal to the focal length of the mirror. Filter 12 is the spatial filter for the second stage of processing. To the left of filter 12 along the optical path A' a distance equal to its focal length is another concave mirror 13. This mirror is so oriented as to continue the zigzag optical path. Finally, a second stage observation plane 14 is placed to the right of mirror 13 a distance equal to its focal length. Mirrors 8 and 11 perform a function similar to that of lens 3 in FIG. 1 and mirrors 9 and 13 perform a function similar to that of lens 5 in that they perform the Fourier transformation and inverse Fourier transformation respectively. In addition, they serve to form the zigzag optical path which allows the long optical path necessary to be fitted into a more compact space. The spatial filters 4 and 12, the observation planes 10 and 14, and the transparency 2 are placed parallel to the mirrors 8, 9, 11 and 13. Since only two stages of processing are shown, there is only one intermediate observation plane, in particular plane 10. It should be clear that many more stages could be added according to the principles disclosed herein. Each other intermediate observation plane would take the form of plane 10 which is illustrated in FIG. 3.

FIG. 3 shows that the significant difference between the observation plane 6 of FIG. 1 and the intermediate observation plane 10 of FIG. 2 is a cutout 15 in the latter. It will be recalled that the center image intensity is much higher than that of the convolution points. The cutout 15 in observation plane 10 is adjusted in size to pass the center image to the next stage of processing while the boundary around the cutout 15 provides a surface on which the convolution points may focus. With this explanation of FIG. 3 in mind, the operation of FIG. 2 will now be explained.

The collimated coherent light from source 1 passing through transparency 2 produces diffraction of the input patterns on transparency 2. The mirror 8 subsequently produces the complex Fourier transform of the diffracted pattern. As the drawing shows, the mirror 8 also serves to change the direction of the path of the light from Source 1. The matched spatial filter 4 effects optical multiplication in the frequency domain. Mirror 9 produces the inverse Fourier transformation of the resultant optical multiplication, and it appears on intermediate observation plane 10 as a set of convolution points, and a set of correlation points with center image passing through the cutout 15. If there is a match, the higher intensity of the autoconvolution point will indicate this and its location will indicate the location of the input pattern corresponding to filter 4. The detection of the autoconvolution point may be achieved either by human observation or photoelectric sensing such as the Vidicon tube. This ends the first stage of processing. The reconstructed image will pass through the cutout 15 of the intermediate observation plane 10 and similar processing takes place in the second stage. Of course, the autoconvolution point at observation plane 14 will correspond to a match between the pattern on filter 12 and another of the input patterns.

Thus the system of FIG. 2 provides for multiple stage processing within a compact space and requires no mechanically moving parts. Generally an $m$-stage system can be used to recognize $n$ different patterns, each of which has $p$ variant forms if $m=np$.

FIG. 5 shows another embodiment of the present invention. Similar elements are identified by similar reference characters. In this FIG. observation plane 10' is indicated as a second intermediate observation plane implying further stages of processing not shown. Therefore, plane 10' would be constructed as plane 10. Elements 8', 9' and 11' in the optical path between transparency 2 and mirror 8 represent beam splitters or rotating mirrors. With these elements paths 8'', 9'' and 11'' represent further processing stages through additional zigzag optical paths. Each further path would comprise elements similar to 4, 9 and 10 and in fact each such further path 8'', 9'' and 11'' could be the beginning of a plurality of processing stages. The use of this apparatus greatly increases the capability of the optical processor without the great increase in the length of the apparatus as previously required. It is believed the operation of this embodiment is clear from the explanation given for FIGS. 2 and 3.

FIG. 6 shows a further embodiment in which similar reference characters identify similar apparatus. The arrangement is identical to FIG. 2, up to mirror 8. The mirror 8 is oriented to cause the zigzag optical path as in FIGS. 2 and 5. Placed to the left of mirror 8, a distance equal to its focal length along the optical path, is spatial filter 16 and plane mirror 17. The spatial filter 16 and the plane mirror 17 may be an integral unit. Mirror 17 is oriented so it continues the zigzag optical path. To the right of filter 16 and mirror 17, a distance equal to its focal length along the optical axis, is concave mirror 9. This mirror is oriented, as shown, to continue the zigzag optical path. Placed to the left of mirror 9, a distance equal to its focal length along the optical axis, is intermediate observation plane 18 and plane mirror 19. Mirror 19 is of the same size and location of the cutout 15 in the observation plane of FIG. 3 and is oriented so as to continue the zigzag optical path. It serves to reflect the reconstructed image to continue a zigzag path. The convolution points and correlation points do not fall in mirror 19 and are not reflected. As shown, the system contemplates further processing stages not shown.

The operation of the system of FIG. 6 is similar to that of FIG. 2. The collimated coherent light from source 1 passing through transparency 2 produces the diffraction pattern of the input. Concave mirror 8 changes the direction of the optical path to its zigzag character and also produces the complex spatial Fourier transform of the input image. Spatial filter 16 is the spatial filter for the first stage of processing. Mirror 9 produces the spatial Fourier transform as in the other systems disclosed. The optical path, continuing its zigzag character, strikes intermediate observation plane 18 and plane mirror 19. Observation plane 18 is similar to plane 10 shown in FIG. 3, and the plane mirror is of the same size and location as the cutout 15 so that the reconstructed image is reflected along the zigzag path. The detection for the first stage is made along the outer edge of plane 18 where the convolution points appear, either by human observation or photoelectric detection. A high intensity point indicates one pattern of the input matches the pattern of the spatial filter and its relative location among the other convolution points indicates the location of the matching pattern among other patterns in the input. The original input image strikes the plane mirror 19 through the cutout and continues along the optical path for further processing. One advantage of the system is that it is even more compact than that of FIG. 2. In FIG. 2 the distance along the optical path from mirror 8 to mirror 9 equals the sum of the focal length of mirror 8 and the focal length of mirror 9. In FIG. 6 the distance along the optical axis from mirror 8 to mirror 17 equals the focal length of mirror 8. If the systems of FIGS. 2 and 6 use mirrors 8 of the same focal length, the system of FIG. 6 is more compact by a length equal to the focal length of mirror 9 in FIG. 2.

Another advantage is the mirrors and spatial filters of FIGS. 2, 5 and 6 can be made of metal or other material which can be force cooled by water or a refrigerant. This would allow the use of a more powerful source 1 which would damage the lenses and spatial filter of the prior art systems.

While the invention has been particularly shown and described with reference to a preferred embodiment thereof, it will be understood by those skilled in the art that the foregoing and other changes in the form and details may be made therein without departing from the spirit and scope of the invention.

I claim:

1. An optical pattern identification system comprising:
an input transparency containing patterns to be recognized,
first means for projecting a beam of light through said input transparency,
second means composed of a plurality of stationary light reflective units for causing any portion of said light beam passing through said input device to follow a zigzag optical path, at least some of said reflective units being concave mirrors, a first complex matched optical spatial filter having a Fourier transform characteristic matched to one of the patterns to be identified disposed along said zigzag optical path intermediate a first pair of said concave mirrors at the location of an optical Fourier transform of said input transparency, a second complex matched optical spatial filter having a Fourier transform characteristic matched to another of said patterns to be identified disposed along said zigzag optical path intermediate another pair of said concave mirrors at the location of an optical Fourier transform of said input transparency, a first apertured observation screen means disposed along said zigzag optical path intermediate said first and second pairs of concave mirrors at a location where said transparency is imaged, said screen having a central aperture of a size sufficiently large to pass said image of said transparency and sufficiently small to permit convolution spots to form on said screen, and a second apertured observation screen disposed along said zigzag path beyond said second pair of concave mirrors at a location where said transparency is again imaged, said screen having a central aperture of a size sufficiently large to pass said latter image of said transparency and sufficiently small to permit other convolution spots to form on said second screen.

2. The system of claim 1 wherein all said light reflective units are concave mirrors and each one of said spatial filters is displaced from each one of said concave mirrors between which it is disposed by an amount approximately equal to the focal length of said mirror.